(12) United States Patent
Thomas

(10) Patent No.: US 9,306,877 B2
(45) Date of Patent: Apr. 5, 2016

(54) NOTIFICATION SYSTEM

(71) Applicant: Wendell A Thomas, Evanston, IL (US)

(72) Inventor: Wendell A Thomas, Evanston, IL (US)

(73) Assignee: Thomas and Sons, Inc., Evanston, IL (US)

( * ) Notice: Subject to any disclaimer, the term of this patent is extended or adjusted under 35 U.S.C. 154(b) by 259 days.

(21) Appl. No.: 13/947,414

(22) Filed: Jul. 22, 2013

(65) Prior Publication Data

US 2013/0304840 A1 Nov. 14, 2013

Related U.S. Application Data

(63) Continuation-in-part of application No. 12/248,628, filed on Oct. 9, 2008, now Pat. No. 8,526,579.

(51) Int. Cl.
*H04L 12/58* (2006.01)
*H04M 3/432* (2006.01)
*H04M 3/487* (2006.01)

(52) U.S. Cl.
CPC ............ *H04L 51/00* (2013.01); *H04M 3/432* (2013.01); *H04M 3/4872* (2013.01); *H04M 2201/14* (2013.01)

(58) Field of Classification Search
CPC ..... H04L 51/00; H04M 3/432; H04M 3/4872
USPC ........ 340/286.07; 370/256; 379/88.12, 88.11; 455/404.1, 412.1, 557; 700/9; 702/188; 705/3; 715/710; 707/708; 709/206
See application file for complete search history.

(56) References Cited

U.S. PATENT DOCUMENTS

| | | | |
|---|---|---|---|
| 6,577,988 B1 * | 6/2003 | Travagline et al. ........... 702/188 |
| 7,010,288 B2 * | 3/2006 | Brown ................. H04M 1/642 455/412 |
| 7,184,844 B2 * | 2/2007 | Dausch et al. ................... 700/9 |
| 7,305,068 B2 * | 12/2007 | Tucker ............... H04M 1/6505 379/52 |
| 7,523,397 B2 * | 4/2009 | Cheung et al. ................ 715/710 |
| 7,865,386 B2 * | 1/2011 | Sarkar ......................... 705/7.16 |
| 7,920,841 B2 * | 4/2011 | Martin et al. .............. 455/404.1 |
| 8,166,019 B1 * | 4/2012 | Lee ........................ G06Q 10/02 705/5 |
| 8,219,146 B2 * | 7/2012 | Connors ......... H04M 1/274516 455/414.3 |
| 8,451,101 B2 * | 5/2013 | Somasundaram et al. ....................... 340/286.07 |
| 8,483,096 B2 * | 7/2013 | Vahdat et al. ................. 370/256 |
| 2009/0171694 A1 * | 7/2009 | Ross, III et al. .................. 705/3 |
| 2010/0091955 A1 * | 4/2010 | Thomas ............... H04M 3/432 379/88.12 |
| 2011/0035236 A1 * | 2/2011 | Ross et al. ........................ 705/3 |
| 2013/0304840 A1 * | 11/2013 | Thomas ................. H04L 51/00 709/206 |

* cited by examiner

*Primary Examiner* — Gerald Gauthier
(74) *Attorney, Agent, or Firm* — Cardinal Law Group

(57) ABSTRACT

A notification system with a method for providing a notification including storing a notification request at a home unit; receiving the notification request at a central location, the notification request comprising a message, a notification time, and a destination; storing the message at the central location; associating the message with the notification time and destination; determining a current time; comparing the determined current time to the notification time; opening a communication session with the destination based on the determination; and transmitting the stored message to the destination during the communication session based on the opening.

20 Claims, 4 Drawing Sheets

100

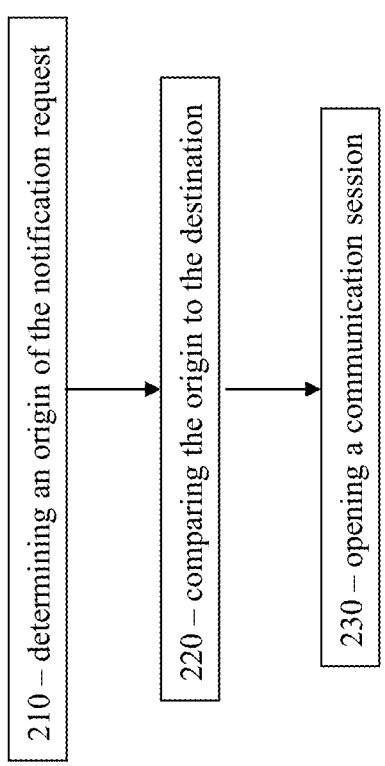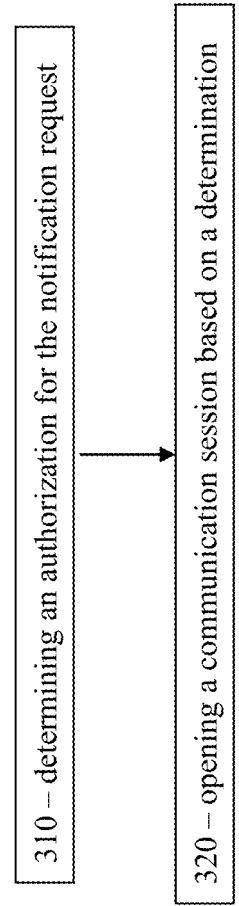
FIG. 2
200
FIG. 3
300

400

500

US 9,306,877 B2

NOTIFICATION SYSTEM

CROSS-REFERENCE TO RELATED APPLICATIONS

This application claims the benefit of and is a continuation-in-part of U.S. patent application Ser. No. 12/248,628, filed Oct. 9, 2008, and incorporated herein in its entirety by reference.

FIELD OF THE INVENTION

This invention relates generally to notifications. More specifically, the invention relates to a notification system.

BACKGROUND OF THE INVENTION

Schedules can be an important aspect of many lives, especially when the schedule relates to important activities. Such activities can include waking up in the morning, medication schedules, medical appointments or the like. However, it is commonly understood that the aging process can erode the ability to set reminders, or even remember what the reminder is for. Numerous computerized systems have arisen to assist with this, such as personal digital assistants (PDA's), and many other computer systems. Many people do not have full or easy access to computers, rendering computerized systems of reduced utility to such people.

Unfortunately, if a user of the computer system is not computer savvy, a computer system is of little use. Many people who are not computer savvy are well acquainted with telephones, and may well be very comfortable with using the telephone. Such users may feel intimidated by computerized solutions, forget to use the computerized solutions, or not understand the message displayed on the computer. Further, any lack of familiarity with the message delivery device may adversely affect compliance with the notification. Designing notification systems for those who are not computer savvy creates its own problems: savvy computer users see such systems as overly simplified and decline to use them.

It would be desirable to provide a notification system and method that overcomes the aforementioned and other disadvantages.

SUMMARY OF THE INVENTION

One aspect of the invention provides a method for providing a notification including storing a notification request at a home unit; receiving the notification request at a central location, the notification request comprising a message, a notification time, and a destination; storing the message at the central location; associating the message with the notification time and destination; determining a current time; comparing the determined current time to the notification time; opening a communication session with the destination based on the determination; and transmitting the stored message to the destination during the communication session based on the opening.

Another aspect of the invention provides a non-transitory computer readable medium including computer readable code for providing a notification, the medium including computer readable code for storing a notification request at a home unit; computer readable code for receiving the notification request at a central location, the notification request comprising a message, a notification time, and a destination; computer readable code for storing the message at the central location; computer readable code for associating the message with the notification time and destination; computer readable code for determining a current time; computer readable code for comparing the determined current time to the notification time; computer readable code for opening a communication session with the destination based on the determination; and computer readable code for transmitting the stored message to the destination during the communication session based on the opening.

Another aspect of the invention provides a system for providing a notification including means for storing at a home unit a notification time, message and destination; means for receiving at a central location the stored notification time, message and destination; means for storing at the central location the received notification time, message and destination; means for determining a current time; means for comparing the determined current time to the notification time; means for opening a communication session with the destination based on the determination; and means for transmitting the stored message to the destination during the communication session based on the opening.

The aforementioned, and other features and advantages of the invention will become further apparent from the following detailed description of the presently preferred embodiments, read in conjunction with the accompanying drawings. The detailed description and drawings, which are not to scale, are merely illustrative of the invention rather than limiting, the scope of the invention being defined by the appended claims and equivalents thereof.

BRIEF DESCRIPTION OF THE DRAWINGS

FIG. 2 illustrates an exemplary method of providing a notification in accordance with one aspect of the invention, including determining when the origin and the destination are the same;

FIG. 3 illustrates an exemplary method of providing a notification in accordance with one aspect of the invention, including determining when the notification request is authorized;

DETAILED DESCRIPTION OF THE DRAWINGS

Figure 1:
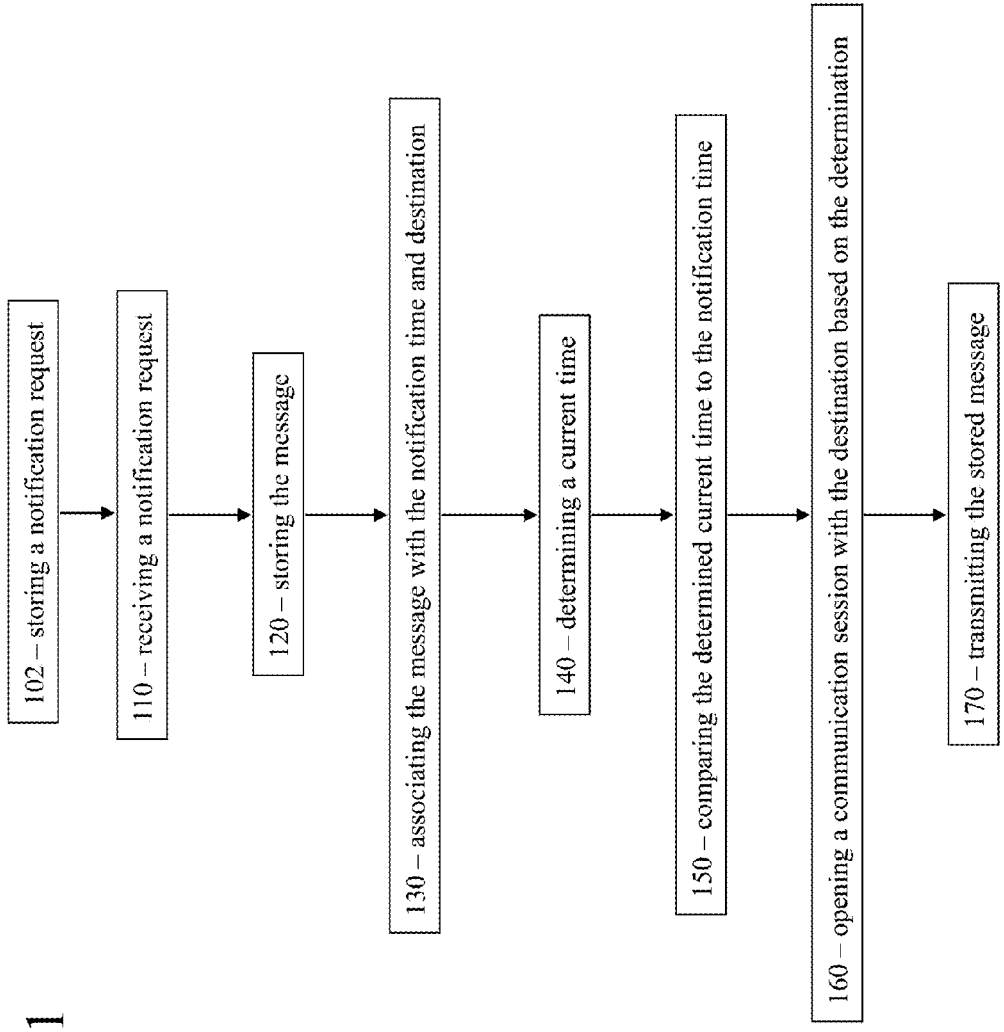
FIG. 1 illustrates an exemplary method of providing a notification in accordance with one aspect of the invention.

FIG. 1 illustrates an exemplary method 100 of providing a notification in accordance with one aspect of the invention. Method 100 begins at step 102 by storing a notification request at a home unit. The home unit can be any communication device capable of communicating with a central location over a communication network, such as a home computer (desktop, laptop, tablet), a smart phone, a cellular phone, a landline phone, a computer tablet, or the like.

The method 100 continues at step 110 by receiving a notification request at a central location. The notification request includes a message, a notification time, and a destination. The central location can be any particular location, including a geographically dispersed computer network. The notification request can be received using a computer network, such as the internet, or via a telephone line, such as a Public Switched Telephone Network (PSTN). The PSTN can be utilized using POTS or a packet data connection. Alternatively, the notification request can be received using a wireless network, such as a cellular network or satellite network. The message can be an audible or text message. The text message can be any text format suitable for transfer over a communication network, such as a short message service (SMS) text message. The audible message can be any series of sound waves, such as a voice, a tone, a jingle, music, or the like. Exemplary voices include the user's voice, or a voice familiar or unfamiliar to the user. The message can convey any desired message. The notification time can be any time, including at least a time of day, and further possibly including a day, month, and/or year. The notification time can also be expressed in UNIX time. The destination is a telephone number to receive the notification.

At step 120, the message is stored at the central location. In one embodiment, a database structure is utilized to store the message, and in step 120, associate the message with the notification time and destination. A current time is determined at step 140. In one embodiment, the notification time is converted to a standardized time (such as, Eastern Standard Time, Greenwich Mean Time, UNIX time, or the like), and the current time is determined, as measured by the standardized time.

At step 150, the determined current time is compared to the notification time. The comparison may be made on an absolute match basis requiring a full match, or the comparison may be made to determine whether the current time is within a predetermined time span from the notification time. Based on the determination, the central location opens a communication session with the destination based on the determination at step 160, and transmits the stored message to the destination during the telephone call based on the session opening during step 170. In one embodiment, the method 100 can optionally include presenting the stored message on an audio output device or text display device as appropriate. In another embodiment, the method 100 can optionally include converting an audible message to a text message or converting a text message to an audible message. In one example, the conversion is included in the storing a notification request at the home unit 102. In another example, the conversion is included in the storing the message at the central location 120.

In one embodiment, the message included in the notification request stored at the home unit is an audible message and the stored message transmitted to the destination is also an audible message. The home unit can be an audio input device, such as a computer (with a microphone), a smart phone, a cell phone, or the like. The home unit can optionally be a landline phone. In one embodiment, the stored message can be presented from an audio output device, such as a computer (with speakers or headphones), a smart phone, a cell phone, or the like. In one embodiment, stored message can be presented on a landline phone.

In one embodiment, the message included in the notification request stored at the home unit is an audible message and the stored message transmitted to the destination is a text message. The home unit can be an audio input device, such as a computer (with a microphone), a smart phone, a cell phone (with SMS messaging), or the like. The home unit can optionally be a landline phone. In one embodiment, the stored message can be presented from a text display device, such as a computer (with a screen), a smart phone, a cell phone, or the like. In one embodiment, the storing the message at the central location 120 can include converting the message from an audible message to a text message. In one example, the conversion is included in the storing a notification request at the home unit 102. In another example, the conversion is included in the storing the message at the central location 120.

In one embodiment, the message included in the notification request stored at the home unit is a text message and the stored message transmitted to the destination is also a text message. The home unit can be can be a text input device, such as a computer (with a keyboard), a smart phone, a cell phone, or the like. In one embodiment, the stored message can be presented from a text display device, such as a computer (with a screen), a smart phone, a cell phone, or the like.

In one embodiment, the message included in the notification request stored at the home unit is a text message and the stored message transmitted to the destination is an audible message. The home unit can be can be a text input device, such as a computer (with a keyboard), a smart phone, a cell phone, or the like. In one embodiment, the stored message can be presented from an audio output device, such as a computer (with speakers or headphones), a smart phone, a cell phone, or the like. In one embodiment, stored message can be presented on a landline phone. In one embodiment, the storing the message at the central location 120 can include converting the message from a text message to an audible message. In one example, the conversion is included in the storing a notification request at the home unit 102. In another example, the conversion is included in the storing the message at the central location 120.

FIG. 2 illustrates an exemplary method 200 of providing a notification in accordance with one aspect of the invention, including determining when the origin and the destination are the same. Specifically, method 200 focuses on opening the communication session when the origin and the destination are the same. At step 210, the central location determines an origin of the notification request. At step 220, the determined origin is compared to the destination, and at step 230, the communication session is opened based on the determination that the origin and the destination are the same. Use of method 200 can help reduce the incidence of misconnections for erroneous notifications, such as misdialed numbers when using a telephone system, and ensure that the destination wishes to receive the notification.

FIG. 3 illustrates an exemplary method 300 of providing a notification in accordance with one aspect of the invention, including determining when the notification request is authorized. Specifically, method 300 focuses on opening the communication session when the notification request is authorized. At step 310, the central location determines an authorization of the notification request. At step 320, the communication session is opened based on the determination that the notification request is authorized. Use of method 300 can help reduce the incidence of misconnections for erroneous notifications, such as misdialed numbers when using a telephone system, and ensure that the destination wishes to receive the notification.

Figure 4:
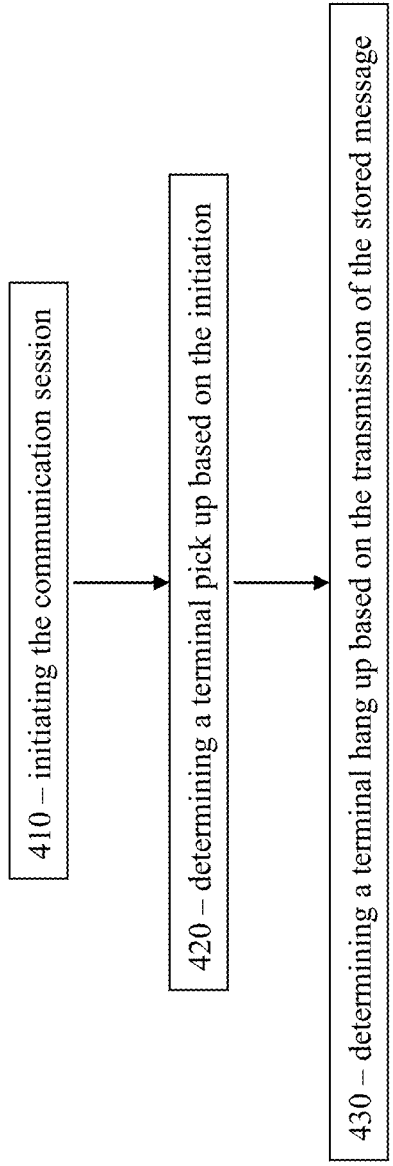
FIG. 4 illustrates an exemplary method of providing a notification in accordance with one aspect of the invention, including determining when the communication session ends.

FIG. 4 illustrates an exemplary method 400 of providing a notification in accordance with one aspect of the invention, including determining when the communication session ends. Specifically, method 400 focuses on connecting the communication session. At step 410, the central location opens a communication session, and at step 420, the central location determines a terminal pick up based on the initiation. The central location then transmits the message. At step 430, the central location determines a terminal hang up based on the transmission. Those skilled in the art will appreciate that the terminal can be any output device suitable for presenting the audible or text message.

Figure 5:
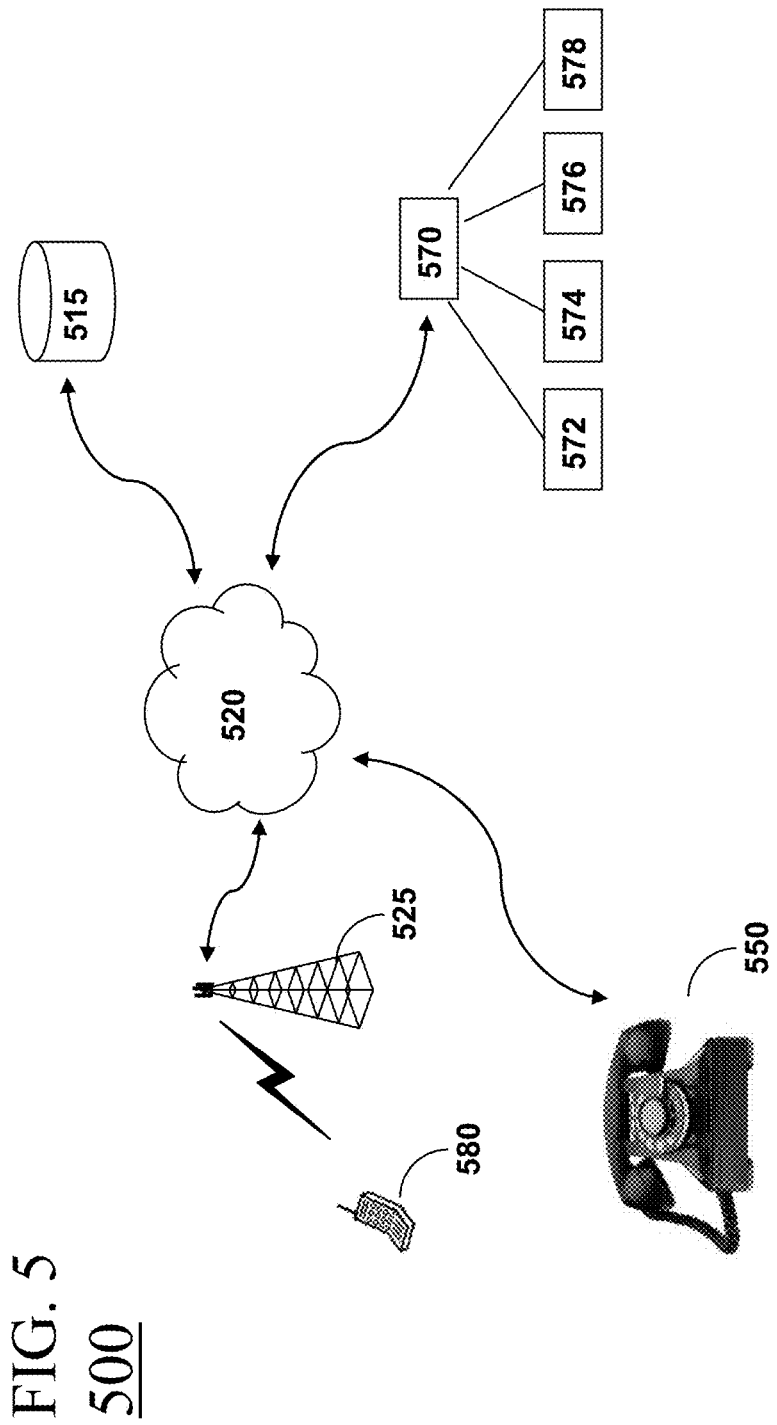
FIG. 5 illustrates an exemplary system for providing a notification in accordance with one aspect of the invention.

FIG. 5 illustrates a system 500 for providing a notification in accordance with one aspect of the invention. System 500 includes landline phone 550 and/or cell phone 580. Landline phone 550 connects to communication network 520. Cell phone 580 connects to communication network 520 via cellular network 525. The telephone network then connects to central location 515. The communication network 520 can be a global system of interconnected with computer networks, such as the Internet; a telephone network; combinations thereof; or any other suitable communication network.

In one embodiment, the system 500 includes a home unit 570 configured to receive the notification request, as well as initiate the notification. In such an embodiment, the user controls all aspects of the communication, and the notification request is not handled at a central location, but rather at a location within full control of the user. Home unit 570 includes a receiver for the notification request, such as a keypad for entering date and time information, a microphone operably connected to a storage medium for receiving and storing the message, and a device for initiating the telephone call and transmitting the message. Home unit 570 communicates with the PSTN or other communications network. Home unit 570 functions as the central location as described above, but home unit 570 is within the destination. Those skilled in the art will appreciate that the various components of the system 500 can include non-transitory computer readable media for storing computer readable code, and processors operable to carry out the instructions included in the computer readable code.

Referring to FIG. 5, the home unit 570 can include auxiliary devices such as a microphone 572 as an audio input device, a speaker 574 as an audio output device, a display screen 576 as a text display device, and/or a keyboard 578 as a text input device. The auxiliary devices can be integrated into the home unit 570 or can be external to the home unit 570. In one example, the home unit 570 is a desktop computer and the auxiliary devices are connected to the desktop computer. In another example, the home unit 570 is a smart phone and the auxiliary devices are incorporated within the smart phone.

Using the disclosures contained herein, a person can receive notifications of important times using a trusted device, such as their telephone or other home unit. More particularly, the notification can be in a trusted voice, such as the user's own voice, or the voice of their children, caretaker, or the like. The notifications can be set to recur multiple times during a day, or on a daily, weekly, monthly, and/or yearly (or other) basis, or the notification can be a one time notification. The time for the notification can be adjusted as needed for a particular application.

As defined herein, "non-transitory computer readable medium" comprises all computer readable medium, with the sole exception being a transitory, propagating signal. The non-transitory computer readable medium can include volatile and/or non-volatile memory. Volatile memory can include memory that depends upon power to store information, e.g., various types of dynamic random access memory (DRAM), and the like. Non-volatile memory can include memory that does not depend upon power to store information, e.g., solid state media such as flash memory, EEPROM, phase change random access memory (PCRAM), and the like. Other exemplary non-transitory computer readable medium include optical discs such as digital video discs (DVD), high definition digital versatile discs (HD DVD), compact discs (CD), and laser discs; magnetic media such as magnetic tapes, tape drives, floppy discs, and magnetic hard drives; solid state media such as flash memory, memory cards, solid-state drives, USB flash drives, random access memory (RAM), static random access memory (SRAM), dynamic random access memory (DRAM), magnetic random access memory (MRAM), phase change random access memory (PCRAM), read-only memory (ROM), programmable read-only memory (PROM), erasable programmable read-only memory (EPROM), electrically erasable programmable read-only memory (EEPROM); and other types of media from which a computer, a processor or other electronic device can read.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for providing a notification under control of a user, the method comprising:
    storing a notification request created by the user at a home unit, the notification request comprising a message, a notification time, and a destination;
    receiving the notification request at a central location;
    storing the message at the central location;
    associating the message with the notification time and destination;
    determining a current time;
    comparing the determined current time to the notification time;
    opening a communication session with the destination based on the determination; and
    transmitting the stored message to the destination during the communication session based on the opening.

2. The method of claim 1 wherein the message is an audible message.

3. The method of claim 2 wherein the stored message is an audible message.

4. The method of claim 3 further comprising presenting the stored message on an audio output device selected from the group consisting of a computer, a smart phone, and a cell phone.

5. The method of claim 2 further comprising presenting the stored message on a landline phone.

6. The method of claim 2 further comprising converting the audible message to a text message, the stored message being a text message.

7. The method of claim 6 further comprising displaying the text message on a text display device selected from the group consisting of a computer, a smart phone, and a cell phone.

8. The method of claim 2 wherein the home unit is an audio input device selected from the group consisting of a computer, a smart phone, and a cell phone.

9. The method of claim 2 wherein the home unit is a landline phone.

10. The method of claim 1 wherein the message is a text message.

11. The method of claim 10 wherein the stored message is a text message.

12. The method of claim 11 further comprising displaying the stored message on a text display device selected from the group consisting of a computer, a smart phone, and a cell phone.

13. The method of claim 10 further comprising converting the text message to an audible message, the stored message being an audible message.

14. The method of claim 13 further comprising presenting the audible message on an audio output device selected from the group consisting of a computer, a smart phone, and a cell phone.

15. The method of claim 13 further comprising presenting the audible message on a landline phone.

16. The method of claim 10 wherein the home unit is a text input device selected from the group consisting of a computer, a smart phone, and a cell phone.

17. A non-transitory computer readable medium including computer readable code for providing a notification under control of a user, the medium comprising:
   computer readable code for storing a notification request created by the user at a home unit, the notification request comprising a message, a notification time, and a destination;
   computer readable code for receiving the notification request at a central location;
   computer readable code for storing the message at the central location; computer readable code for associating the message with the notification time and destination;
   computer readable code for determining a current time;
   computer readable code for comparing the determined current time to the notification time;
   computer readable code for opening a communication session with the destination based on the determination; and
   computer readable code for transmitting the stored message to the destination during the communication session based on the opening.

18. A system for providing a notification under control of a user, the system comprising:
   a home unit; and
   a central location operable to communicate with the home unit;
   wherein the home unit is operable to:
      store a notification request created by the user, the notification request comprising a message, a notification time, and a destination; and
   wherein the central location is operable to:
      receive the notification request;
      store the message;
      associate the message with the notification time and destination;
      determine a current time;
      compare the determined current time to the notification time;
      open a communication session with the destination based on the determination; and
      transmit the stored message to the destination during the communication session based on the opening.

19. The system of claim 18 wherein the home unit is an audio input device.

20. The system of claim 18 wherein the home unit is a text input device.

* * * * *